United States Patent [19]
Lepley et al.

[11] Patent Number: 5,389,963
[45] Date of Patent: Feb. 14, 1995

[54] SYSTEM FOR SELECTIVELY INTERCONNECTING AUDIO-VIDEO SOURCES AND RECEIVERS

[75] Inventors: John A. Lepley, Lawton; John A. Lepley, Jr., Paw Paw, both of Mich.

[73] Assignee: Dynacom, Inc., Mishawaka, Ind.

[21] Appl. No.: 831,352

[22] Filed: Feb. 5, 1992

[51] Int. Cl.⁶ ............................................. H04N 7/10
[52] U.S. Cl. ........................................ 348/7; 348/8; 455/4.2; 359/125
[58] Field of Search ................. 358/86; 455/3.1, 4.1, 455/4.2, 5.1, 6.1; 380/5, 10; 348/6, 7, 8, 12; 359/125, 137, 142, 146

[56] References Cited

U.S. PATENT DOCUMENTS

| | | |
|---|---|---|
| Re. 29,997 | 5/1979 | den Toonder . |
| Re. 31,639 | 7/1984 | Nicholson ............................ 455/4 |
| 3,914,534 | 10/1975 | Forbes . |
| 4,135,202 | 1/1979 | Cutler ................................ 358/86 |
| 4,302,771 | 11/1981 | Gargini .............................. 358/86 |
| 4,367,557 | 1/1983 | Stern et al. ......................... 455/4 |
| 4,381,522 | 4/1983 | Lambert ............................ 358/86 |
| 4,395,780 | 7/1983 | Gohm et al. . |
| 4,443,769 | 4/1984 | Aschwanden et al. ........... 455/260 |
| 4,491,983 | 1/1985 | Pinnow et al. . |
| 4,506,387 | 3/1985 | Walter . |
| 4,538,174 | 8/1985 | Gargini et al. .................... 358/86 |
| 4,567,512 | 1/1986 | Abraham .......................... 358/86 |
| 4,706,121 | 11/1987 | Young ............................... 358/142 |
| 4,734,764 | 3/1988 | Pocock et al. .................... 358/86 |
| 4,885,803 | 12/1989 | Hermann et al. . |
| 4,890,320 | 12/1989 | Monslow et al. ................. 380/50 |
| 4,901,367 | 2/1990 | Nicholson ...................... 358/86 X |
| 4,920,432 | 4/1990 | Eggers et al. .................... 360/33.1 |
| 4,947,244 | 8/1990 | Fenwick et al. .................. 358/86 |
| 4,949,170 | 8/1990 | Yanagidaira et al. ............. 358/86 |
| 4,994,908 | 2/1991 | Kuban et al. ..................... 358/86 |
| 4,994,909 | 2/1991 | Graves et al. .................... 358/86 |
| 5,018,021 | 5/1991 | Slater ............................... 358/349 |
| 5,231,494 | 7/1993 | Wachob ........................ 358/86 X |

FOREIGN PATENT DOCUMENTS

| | | |
|---|---|---|
| 0277014A2 | 1/1988 | European Pat. Off. . |
| 0430711A2 | 11/1990 | European Pat. Off. . |
| 02652701A1 | 1/1989 | France . |

Primary Examiner—Curtis Kuntz
Assistant Examiner—Edward Urban
Attorney, Agent, or Firm—Barnes & Thornburg

[57] ABSTRACT

A system for selectively interconnecting a plurality of audio/video sources and a plurality of audio/video communication devices including a single switch, a mixer to combine the audio and video signals as a single signal from a source to the switch and a modulator for modulating the video signal after the switch for optical transmission to the communication devices. The modulated audio and video signals directly drive an optical transmitter as a composite signal. A programmable interface is provided at the sources and at the communication devices for translating system remote control signals to source and communication device control signals for the connected device. The interface provides ALL CALL overrides.

23 Claims, 9 Drawing Sheets

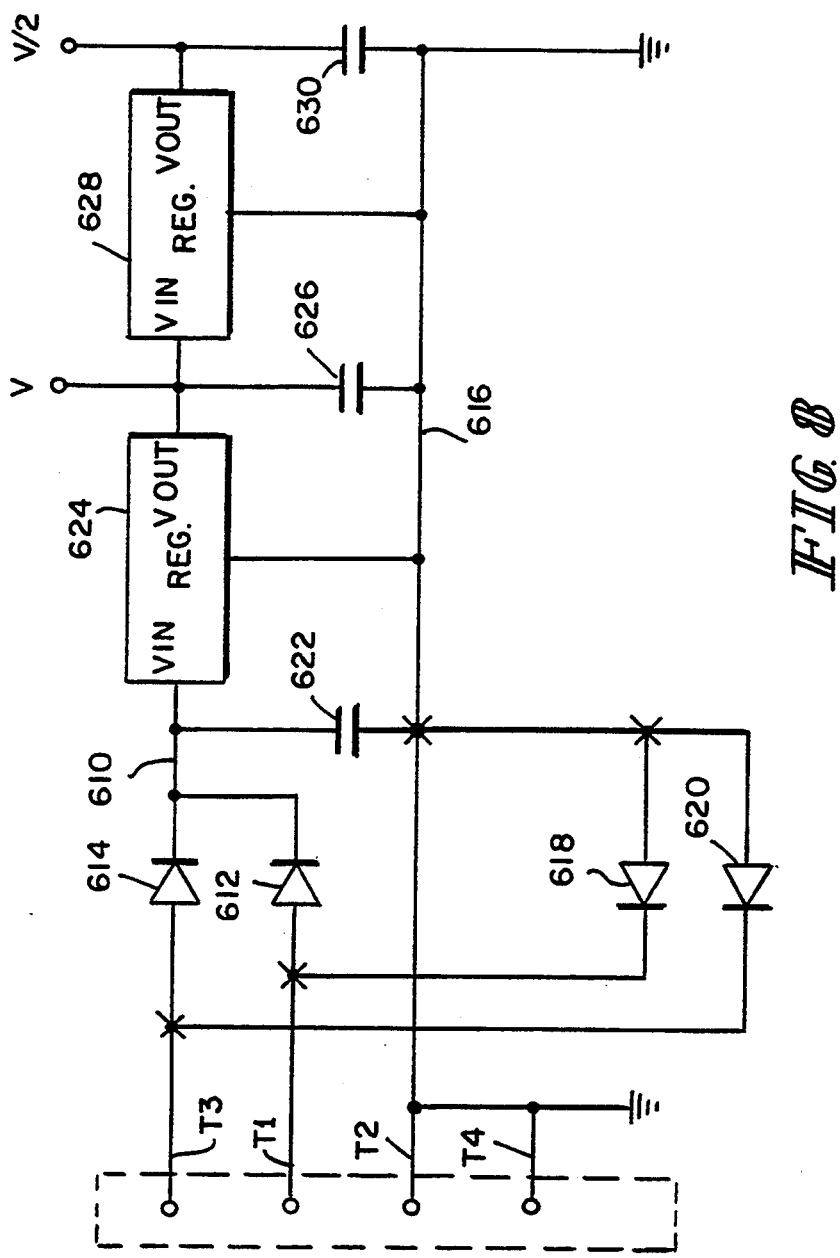

SYSTEM FOR SELECTIVELY INTERCONNECTING AUDIO-VIDEO SOURCES AND RECEIVERS

TECHNICAL FIELD

The present invention relates generally to a multimedia communication network and more specifically to a multimedia communication network design for the classroom setting.

BACKGROUND ART

This history of multimedia presentation in the classroom begins with the cart containing a projector, for example, 16 mm film projector, slide projector or overhead projector. The cart is generally rolled in by a member of the audiovisual staff and used by the teacher. The film, slides, or material to be displayed within the room is generally secured separately by the teacher. Thus there is a scheduling requirement in obtaining the material and the projector at the same time. Similarly, the ability of the teacher to use the equipment varies. The transport and use of the equipment produces unnecessary wear and tear on the equipment, as well as the medium to be loaded and viewed. Although initially television sets were also provided on carts, most classrooms today are equipped with permanent television sets.

The next level of development was the including of cable connections to each of the classrooms either from a cable tv service (CATV) or a master antenna (MATV) as in the home or in hotel or motel rooms. The teacher then had available programming which was scheduled by the supplier of the CATV or MATV service. This requires the teacher to schedule the presentation about the schedule of the service provider.

Early attempts to provide a central location within a facility having a plurality of multimedia devices, each assigned to a specific channel on a cable wire service, has not been cost effective. To match the quality of signal produced by the cable company, the equipment required in the facility include, high quality broad band amplifiers, automatic audio/video level equipment with separate sync and video processing to maintain the correct AM picture modulation level, circuits to reduce the sound to match the cable company's sound carrier reduction scheme, top quality band pass filters for each channel, high quality AGC, etc. To provide an RF signal of less than cable quality is unacceptable and causes more problems.

Dynacom has provided systems which include individual cables connecting monitors in the room with a central location which controls a plurality of multimedia sources so as to selectively provide prearranged multimedia material to the classroom when desired. The controls in the classroom activate and deactivate scheduled materials on que from one of a plurality of sources. Using fiber optics as the communication link between the classrooms and the central location, AM or IM "intensity modulation" for the video with an audio FM subcarrier riding on the AM video do not produce the desired signal. As with the cable system, expensive signal processing equipment would be needed to provide the desired quality of signal. Thus there is a need for fiber transmitters and receivers using a different method of signal transmission.

Also in the earlier systems, a separate routing system was used for the audio and video signals. This greatly increased the expense of the installation. Combining a modulated audio signal as a subcarrier on a modulated video signal as a single input to a routing switch also did not produce acceptable results without expensive signal processing.

Prior art optical transmitters of audio-video signals use a single RF-FM video carrier with the audio channel as a subcarrier on the base band video. In order to transmit and receive a quality signal, expensive additional circuitry and filters were required to obtain acceptable audio signal to noise ratio. Circuitry included complex optical drive and current sensing circuitry which further included complex temperature and bias controls.

In the earlier Dynacom systems, an interface was developed between the systems controller and the source to allow the remote control signals from the classroom to be interpreted and control the multimedia source. Using a VCR for example, interface had to be programmed for converting the remote control signal from the system to the appropriate remote control signals for the specific VCR. The interface device was then hardwired into the internal controls of an off-the-shelf VCR. This requires an extensive amount of time for the conversion and installation of the interface to an off-the-shelf VCR since the appropriate connection points had to be determined for each source. The same problem exists for the monitors in the classroom.

DESCRIPTION OF THE INVENTION

An object of the present invention is to provide an integrated information system for multimedia which provides superior quality audio and video at a reasonable expense.

Another object of the present invention is to provide an audio/video distribution system capable of using a single routing switch while maintaining signal quality.

A further object of the present invention is to provide an audio/video communication system with improved signal mixing for signal transmission.

A still further object of the present invention is to provide an audio/video communication system using fiber optics with improved signal quality transmission.

An even further object of the present invention is to provide a routing or cross-point switch for audio/video communication with maximum expandability options using minimum components.

Still even a further object of the present invention is to provide a communication system for audio/video sources and communication devices with improved interface for remote control of the sources from the communication device.

An even a further object of the present invention is to provide a communication system for audio/video sources and communication devices with improved interface for control of the sources and the communication devices for a system all call.

These and other objects are achieved by a system for interconnecting a plurality of sources of audio/video signals and a plurality of audio/video communication devices. In the environment to be discussed, the audio and video sources may be VCR, 16 mm, etc. and the communication devices are a television receiver.

The system includes a switch for selectively connecting a plurality of audio/video signals from the plurality of sources at its input to the output of the switch. A plurality of transmitters are connected to respective outputs of the switch and include a first modulator for modulating the received video signal. The transmitter transmits the modulated video signal and the received audio signal simultaneously at its output. A plurality of receivers, each connected to an output of a respective transmitter, receives, separates and demodulates the transmitted video and audio signals and provides the demodulated signals to a respective communication device. A system controller or supervisor determines the communication paths using the switch.

The audio signals from the sources are modulated by second modulators and provided to the switch as a modulated signal. Preferably a single routing switch is used wherein the modulated audio signal is combined with the video signal to be provided as a single input to the switch. A plurality of separators are provided at the output of the switch to separate the video signal from the modulated audio signal. The first modulator, modulates the video signal to be combined with the previously modulated audio signal and to be transmitted as a single combined signal. A differential amplifier is used to combine the modulated audio signal and the video signal prior to the switch. If the audio signal is stereo, a third set of modulators are provided such that the two modulated audio signals and the video signal are combined and provided to the switch.

The modulators for the audio and video signals only require the voltage controlled oscillator portion of a phase-locked loop whereas the demodulator of the video signal is a complete phase-locked loop. The audio signal modulator and demodulator have their frequency of modulation determined by tuned circuit of a capacitor and an inductor. Thermistors are thermally and electrically connected to the modulators for temperature compensation.

The mixer of the switch, the transmitters and the receivers each include a commonly configured power source for converting AC or DC power to DC power having value V, V/2 and ground representing V+, ground and V− respectfully in the mixers, transmitters and receivers. The power source has two power input terminals and a ground input terminal. The ground input terminal is connected to a ground bus. A first pair of diodes connect the first and second power terminals to a power bus and a second pair of removable diodes connect the first and second power terminals to the ground bus. This allows the power source to receive DC, 24 volt AC and 12 volt AC.

The cross-point switch is designed to allow parallel connection of the output drivers of a plurality of cross-point switches without additional secondary switching. The cross-point switch includes M input ports connected to an M line input bus and N output bus connected to an N output ports by N switchable output drivers. A plurality of m33 n switch modules are connected to the input and output buses for selectively connecting m input ports to n output ports. A selector is provided on each cross-point switch for selecting the connection of the cross-point of the switching modules and selecting individually the state of the output drivers. The output drivers are capable of driving a 75 ohm load.

To increase the capacity of inputs, for example to $2M \times N$, a second cross-point switch is provided having its output ports connected in parallel to the output points of the first cross-point switch. A controller is provided for controlling the selector on each of the cross-point switches to select the state of the output drivers, whereby only one output driver at each parallel output port is on at one time. Each of the switching modules includes a switchable buffer connecting its output to the output bus and the selector selects the individual state of each of the buffers. This reduces the loading of the output bus.

An interface between the plurality of sources and the switch or transmission system is uniquely designed. The interface selectively connects the audio/video signals from one or more of the sources as an input audio/video input to the switch. The interfaces are programmable to interface the system remote control signals to the source remote control signals for the source connected to the interface. The system controller or supervisor receives system remote control signals from the individual rooms and provides controls to the interfaces to select and control the appropriate source and provide audio/visual signals to the switch which is also under the system supervisor's control. By using the standard remote control port of the source and programming at the interface, the installation time is substantially reduced since no invasive procedure is required. Preferably, the remote control port is an optical receiver and the interface has an optical transmitter.

The classroom also has an interface programmed for translating system remote control signals to remote control signals for controlling the communication device or monitor. The classroom interface also receives local remote control signals and translates them to system control signals and communication device remote control signals. In response to an ALL CALL signal the source interface selects an ALL CALL audio/video signal common to all of the source interfaces and disables the local remote control at the communication device interface.

Preferably the communication of the system remote control signal to the system controller is via dual tone multiple frequency (DTMF). One of the remote communication devices may include a display screen and computer control entry device, for example a keyboard or a mouse. One of the sources may be a computer and the system controller selectively connects the display screen and the computer control entry device to the computer via an interface. The computer control entry device and the computer may each have wireless ports.

Other objects, advantages and novel features of the present invention will become apparent from the following detailed description of the invention when considered in conjunction with the accompanying drawings.

BRIEF DESCRIPTION OF THE DRAWINGS

FIG. 8 is a schematic of a power source according to the principles of the present invention.

FIG. 9 is a DC source connectable to the power source of FIG. 8.

FIG. 10 is a center tap AC source connectable to the power source of FIG. 8.

FIG. 11 is a non-tap AC source connectable to the power source of FIG. 8.

BEST MODE FOR CARRYING OUT THE INVENTION

Figure 1:
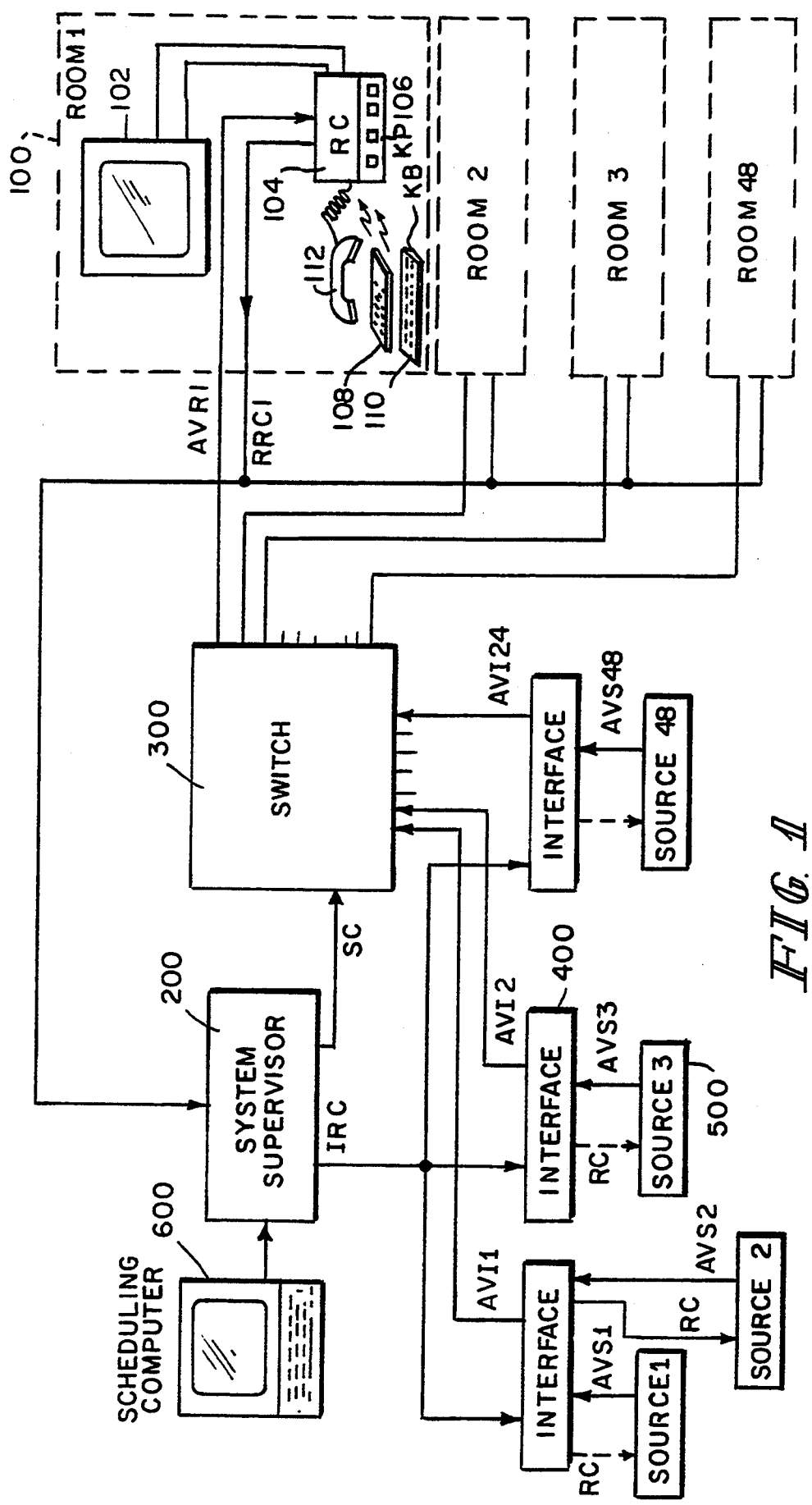
FIG. 1 is a block diagram of an integrated information system according to the principles of the present invention.

An integrated information system, is illustrated in FIG. 1 as including a centrally located video source origination and distribution system including elements 200–600 connected to remote rooms 100. The centrally located system is equipped with sources 500 which include video, film, or computer playback devices, such as VCRs, video disk players and film to video convertors. A system supervisor 200 receives remote control signals RRC from the rooms and provides a source remote control signal SRC to interface circuits 400 to control the sources 500 connected to the interfaces 400. The audio/visual outputs of the interfaces AVI are connected to a switch 300 which receives a switch control signal SC from the system supervisor 200 to direct the interface audio/visual signal AVI the appropriate room 100 as audio visual room signal AVR. The multimedia center also provides for local, studio originated, direct network/satellite, TVRO viewing and teleconferencing. The system also offers a menu channel with that which accesses the sources available to all classrooms such as CNN, lunch menus, and practice schedules.

Various multimedia services are prescheduled by users and are logged in on a scheduling computer 600 located in the media center. The user then accesses and controls the preloaded media source 400 at anytime within a scheduled period through the use of a room controller 104 in each of the rooms or instructional areas. Although system access and control normally are handled by the user from the instructional area, the media center can also originate and control programming to any number of its instructional areas simultaneously when desired. This allows display monitors in the selected areas to automatically be powered up and the audio/video switched through at pre-set levels with no instructional area terminal operation involved. This feature also enables emergency announcements or telecasts to be efficiently handled as "ALL CALL" function overriding any local control or program.

The integrated information system provides fiber or coaxial based, classroom control of audio/visual equipment from a central location and integrates voice, video and data in a standard control panel. The integrated information system is capable of handling standard NTSC, HDTV, FDDI and DS-3. The system is software controlled with the flexibility of expanding to a 1000 inputs by 1000 outputs at the central location.

Each classroom or instruction center 100 includes a monitor 102 controlled by a room controller 104. The room controller 104 receives the audio/visual AVR signal for its room and provides a room remote control signal RRC to the system supervisor 200 of the remote multimedia center. The control inputs for the room control are from a keypad 106 affixed to the remote controller 104 or a remote control unit 108 connected to the room controller 104 by an optical, preferably infra red, communication link. A computer keyboard KB 110, by hardwired or also an infra red link may also be providing input to the room controller 104 so as to communicate with a computer terminal at the remote multimedia location. If available, the room controller 104 can also receive inputs from a telephone handset 112. As will be discussed with respect to FIG. 2, the room remote control signals RRC are preferably dual tone multiple frequency (DTMF) signals used in the standard telephony communication. Thus the keypad 106 or remote control 108 have the standard 12 buttons of a telephone set for the appropriate DTMF communication as well as additional buttons to be discussed.

Figure 2:
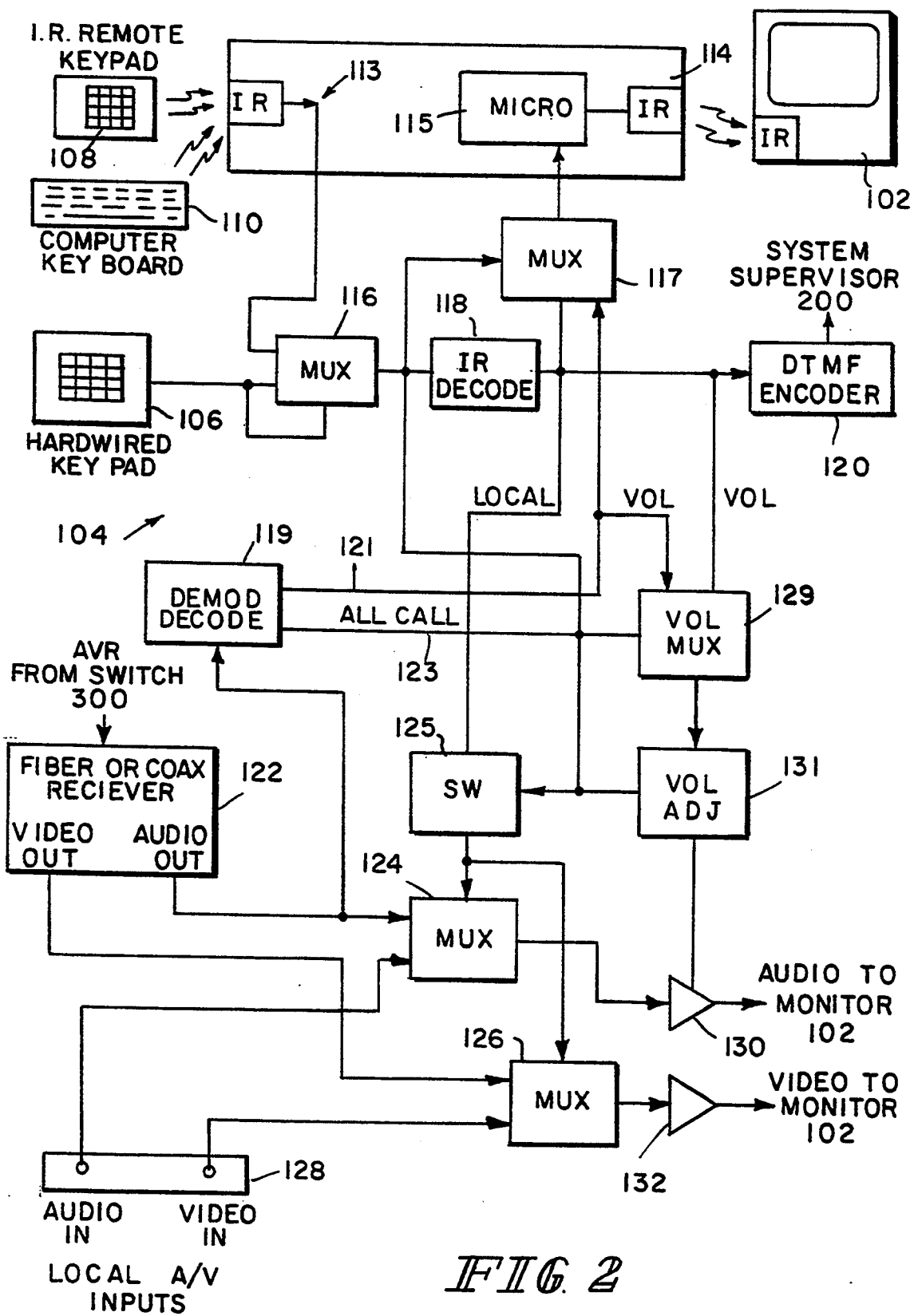
FIG. 2 is a block diagram of a remote controller according to the principles of the present invention.

The detail of the room controller 104 is illustrated in FIG. 2. The remote control, infra red receiver 114, receives the remote control signals from the remote keypad 104 at IR receiver and amplifier 113 and provides these signals through multiplexer 116 to the IR decoder 118. The other input to the multiplexer 116 are IR type of pulses from the hardwired keypad 106, which also controls the multiplexer 116 to select the keypad 106 over keypad 104. Keypads 108 and 106 have identical keyboard layout for the remote control functions with the hardwired keypad 106 having additional displays for, for example, power on, program ready, phone message waiting, and local input selected. The common format of the keypads 106 and 108 are specific to the system, but independent of the monitors 102 as well as the various sources 500 in the remote location.

The remote control receiver 114 includes a programmable micro controller 115 to translate the remote control signals from the keypads 106 or 108, as determined by multiplexer 116, or demodulator/decoder 119, as determined by multiplexer 117, to remote control signals appropriate for the specific monitor 102. The micro controller may be a PIC 16HC54 with a monostable multivibrator output. If the monitor 102 is a television having an infra red (IR) remote control port, the remote control receiver 114 would provide appropriate IR signals to the monitor 102 as illustrated.

The demodulator/decoder 119 monitors the audio output of the receiver 122 for coded control signals, for example DTMF, mixed with the audio signal. Monitor remote control signals are provided on bus 121 to the multiplexer 117 from the demodulator/decoder 119. An ALL CALL signal, from the demodulator/decoder 119, is provided on line 123 to multiplexer 117, switch 125 and volume multiplexer 129. The ALL CALL signal powers up the monitor 102 via multiplexer 117, controls the volume of monitor via multiplexer 117 or multiplexer 129 and disables local source selection via switch 125.

The details of the receiver 122 will be discussed below with respect to FIG. 7.

The audio and video output from receiver 122 are provided to multiplexers 124 and 126 respectfully which also receive a corresponding local audio and video signal from a local audio and visual input terminal 128. The keypads 106 and 108 also include local or remote selection which are decoded by IR decoder 118 and provide via switch to control the multiplexers 124 and 126 to select the appropriate source for the audio and video outputs to the monitor through drivers 130 and 132 respectively. For an ALL CALL, the switch controls the multiplexers to select the outputs of the receiver 122.

Keypads 106 and 108, via IR decoder 118, also provides audio increase and decrease signals to the monitor 102 via multiplexer 117 and micro controller 115 or to control the gain of the audio driver 130 via volume multiplexer 129 and volume adjust circuit 131. For an ALL CALL, the demodulator/decoder 119 provides audio increase and decrease signals to the monitor 102 via multiplexer 117 and micro controller 115 or to control the gain of the audio driver 130 via volume multiplexer 129 and volume adjust circuit 131 and over rides any local control signals.

If the monitor is completely controllable by remote control, the volume control by volume multiplexer 129 and volume adjust circuit 131 may be deleted. If the volume adjust for audio driver 130 is used, the only control for an ALL CALL which needs to be provided by the micro controller 115 is the power control signal.

The standard signals which are used to control a source device including play, fast forward, reverse, stop, still, step forward or reverse, search (which in this system may include, for example, a menu selection of one of a plurality of static sources or a program selection of one of a plurality of preselected programs) from the key pads 106 and 108 and decoded by IR decoder 118 are encoded by the DTMF encoder 120 and provided as a remote control signal RRC from the rooms back to the media center. They are decoded in the media center and used to control the source 500 selected by the system supervisor 200.

Figure 3:
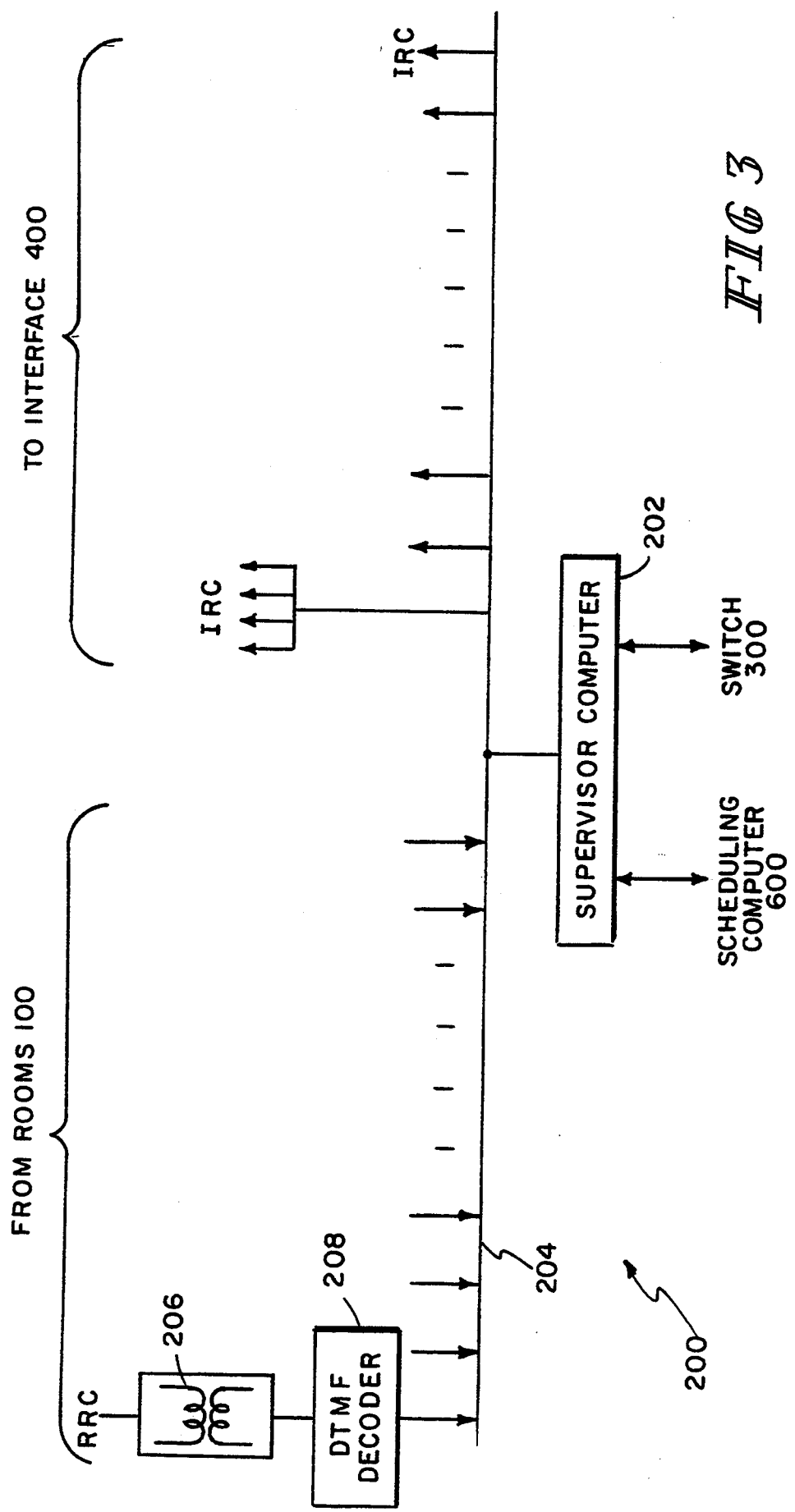
FIG. 3 is a block diagram of a system controller according to the principles of the present invention.

The system supervisor 200 is illustrated in FIG. 3 as including a system computer 202 connected to a scheduling computer 600 by a serial RS232 or a parallel bus depending upon the computer configuration. The supervisor computer 202 also includes a bus 204 which receives remote control signals RRC from the various rooms 100. The input structure for the bus 204 from the rooms includes a transformer 206 which converts the balanced telephony signal to an unbalanced signal for the DTMF decoder 208. Thus the data on the bus 204 is the decoded remote control signals from the various rooms. Although the DTMF decoder 208 is shown as having a single input, available systems on the market may include a plurality of inputs and outputs on a single package.

The supervisor computer 202 receives a remote control signal from the bus 204 and provides an appropriate remote control signal IRC to the interface 400 via the bus 204. Each of the interfaces 400, as will be discussed below with respect to FIG. 12, includes four digital control signals. The computer 202 also provides, based on preselected programming, control signals to the switch 300 to select the interconnection between the sources and the respective rooms. As will be discussed below with respect to FIG. 4, the supervisor computer 202 is connected to the switch 300 by an appropriate series or parallel bus depending upon the processor configuration of the switch 300.

A typical example of a supervisor computer 202 would be a VME/68000 computer from Omnibyte Corporation of Chicago, Ill. The bus 204 is a VME bus also available from Omnibyte Corporation. The supervisor computer 202 and the bus 204 provide the appropriate addressable communication between the supervising computer 202 and the data and the remote control signals RRC from the room and the control signals IRC to the interfaces 400.

Figure 4:
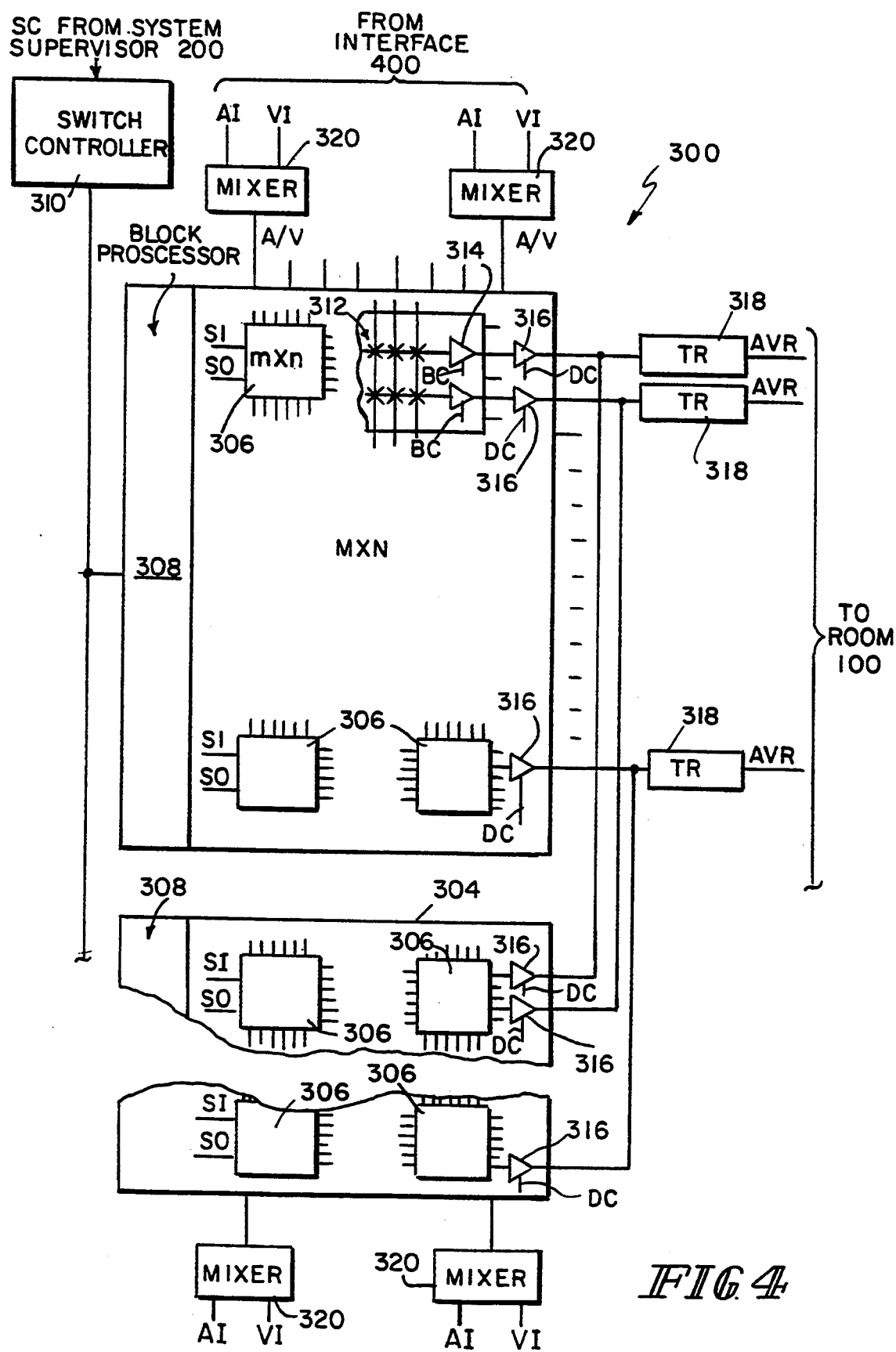
FIG. 4 is a block diagram of a switch according to the principles of the present invention.

The switch 300 is illustrated in FIG. 4 as including two cross-point switches 302 and 304 each having a capacity of M×N. Each of the cross-point switches 302 and 304 includes a plurality of cross-point modules 306 having a capacity of m×n connected between its inputs bus and its output bus. A block processor 308 in each of the cross-points switches 302, 304, receives control signals from the switch controller 310 which receives switch control signal SC from the system supervisor 200. The block processors 308 provide a switch input SI and a switch output SO control signals to each of the switch modules 306 to select the appropriate connection of each cross-point 312 so as to connect a respective input to a respective output. The switch controller 310 may be an IBM PC and the block processor 308 may be micro controlled 16C54 from Microchip, for example.

Each switch cross-point module 306 includes cross-points 312 connected to the input bus and having a switching buffer 314 for each output bus. The buffer 314 of each module 300 is connected in parallel with the buffer 314 of its respective row, to a switching output driver 316. The buffer 314 is activated or deactivated by a buffer control signal BC received from the block processor 308 and the output driver is activated or deactivated by a driver control signal DC also received from the block processor 308. The switchable buffer 314 allows unloading of the row for the modules which are not being used either because of reduced capacity of the number of inputs to outputs, or because they are not selected for the specific output. The output driver 316 provides an appropriate 75 ohm termination drive signal to the output transmitters 318. The transmitters 318 provide the audio/visual signal AVR to a respective room 100.

As illustrated in FIG. 4, the outputs of the two cross-point switches 302 and 304 are connected in parallel to a common transmitter 318 for the respective outputs. The control of the output drivers 316 by the switch controller 310 through the block processors 308 allows only one of the respective parallel connected outputs to be connected as an input to respective transmitter 318. This allows the effective capacity of the switch 300 to be 2M×N. Thus, twice the number of inputs can be provided for the same number of outputs. The frame of each of the cross-points switches 302 and 304 are wired for M×N capacity with the modules 306 being removable so as to reduce the cost of the switch. By providing the switchable output drivers 316 within the frame of the cross-point switches 302 and 304, the parallel connection of the outputs is possible without any additional circuitry or controls. An appropriate switchable audio output driver 316 would be EL2020 from ELANTEC.

In the prior art, the output buffers are separate and distinct from the cross-point switches and secondary switching was required prior to the output drivers 316 in order to connect the outputs in parallel. The present cross-point switches 302 and 304 provide an integrated system wherein the output drivers 316 themselves provide the appropriate output switching without any additional circuitry external connection for controls as well as signal routing.

The cross-point modules 306 may be commercially available, 8×8 video cross-point switch, MAX 456 from Maxim Integrated Products. It should be noted that the inputs to the matrix are from the interfaces 400 through mixers 320. As will be described with respect to FIG. 5, the mixers 320 receive the audio signal AI and the video signal VI from the interfaces 400 and provides them as a single mixed signal to the switches 302 and 304. The combined output of the switches is provided to the transmitters 318 which provides a combined audio visual signal AVR to each of the respective rooms, as will be discussed with respect to FIG. 6. The unique signal mixing allows the use of a single switch for both the audio and video signals. This reduces the cost and the interconnections. Thus switches 302 and 304 should be video quality switches.

Before beginning the discussion of the detail of the mixers 320, the transmitters 318 and the receivers 122, the transmission modulating scheme will be discussed. The prior art transmission of a combined audio/video signal using fiber optics generally used AM or IM (intensity modulation) for the video with an audio FM subcarrier riding on the AM video. Costly equipment is needed to provide an appropriate transmission and even then the quality of the signal cannot be guaranteed. The signal transmission of the present system provides a modulated audio signal and a modulated video signal as a combined signal where both are carriers and not a carrier with a subcarrier thereon. Thus, both the modulated audio signal and the modulated video signal directly drive the output of the transmitter. In the case of an optical system it would directly drive the light source. The modulation is in the RF range with the modulation of the video signal being at a higher RF range than the video signal. The preferred embodiment, the video signal will be modulated in the 30 mega Hertz range while the audio signal is in the 10.7 mega Hertz range. These modulation frequencies are merely examples either may be in the range of 10 mega Hertz to 100 mega Hertz. If a coaxial cable is used to communicate to the rooms, the video signal need not be modulated.

To use a single switch 300 for both the audio and video signals, the mixer 320 will modulate the audio signal received from the interface 400 and combine it as a subcarrier on the video signal and provide it as an input of the switch 300. The transmitter 318 at the output of the switch 300 divides the modulated audio signal from the video signal. The video signal is then modulated. The modulated audio signal and the modulated video signal directly drive the fiber optic driver.

It should be noted that if a coaxial system is used instead of a fiber optic system, the output of the single switch with the modulated audio on the video signal may be transmitted directly to the remote classroom over the coaxial wire. Since the output of the switch is a base band video signal as an analog signal, it is not an appropriate driver for a fiber optic system. In the present system, it is preferred to use the special optical transmitter and optical receiver. This provides a uniform controllable signal of an improved quality.

The present modulating scheme does not modulate the video signal prior to the switch 300. This substantially improves the quality of the signal with respect to frequency control and signal to noise ratios. It should be noted that if stereo inputs are provided, the two audio signals would have separate modulations and combined with the video signal. These combined signals would still be transmitted through a single switch.

Figure 5:
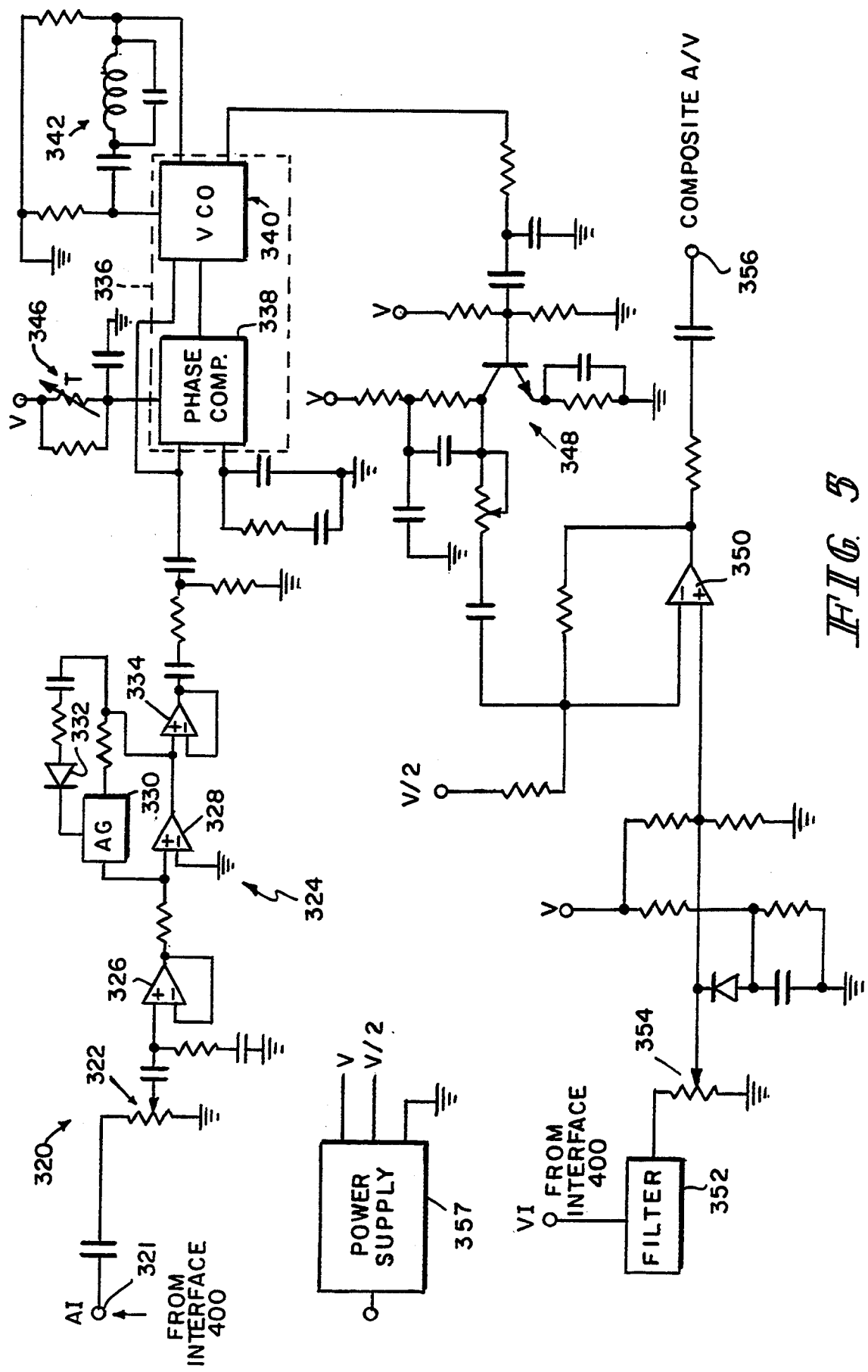
FIG. 5 is a schematic of a mixer according to the principles of the present invention.

A mixer 320, as illustrated in FIG. 5, has an audio input AI and a video input VI from the interface 400. The audio input at 321 is AC coupled through a capacitor and level adjust resistor 322. This signal is then compressed by a compressor 324 which includes an input amplifier 326, a compressor amplifier 328 having an automatic gain feedback stage 330 and a rectifying feedback stage 332. An output operational amplifier 334 provides the signal AC coupled to a phase-locked loop 336.

The output of the amplifier 334 is provided an input to a voltage controlled oscillator 340 of the phase-locked loop 336. A thermistor 346 is mounted to the package of the phase-locked loop 336 and provides appropriate feedback to a phase comparator 338. The output of the phase comparator 338 is connected to the voltage controlled oscillator 340 to provide DC bias control to maintain the center frequency of the voltage controlled oscillator.

The frequency determining circuitry for the voltage controlled oscillator 340 includes a tuned circuit 342 which includes an inductor and a capacitor. Prior art circuits used merely a capacitor. The tuned circuit 342 provides better frequency control and minimizes deviations from the center frequency, in combination with the thermistor 346. In the present embodiment, the tuned circuit 342 is tuned to a frequency of 10.7 mega Hertz. The audio signal varies ±75 kilo Hertz whereas the video signal has a center frequency of 30 mega Hertz and a variation of ±6 to 8 mega Hertz. Thus, the audio modulator and demodulator require a tuned circuit whereas the video modulator and demodulator should not use the tuned circuits.

The output of the voltage controlled oscillator 340 is connected through a buffer amplifier 348 which provides a high impedance output to the negative input of the output amplifier or driver 350. The buffer 348 prevents any feedback from the output driver 350 to the phase-locked loop 336. The video input VI from the interface 400 is provided through a 10.7 mega Hertz rejection filter 352, a level adjust 354 to the plus input of the output driver 350. The output of differential video driver 350 is coupled to the output 356 which is suitable for connection to a 75 ohm coaxial cable. The output of the differential video driver 350 is a mixed audio carrier on the subband video at the output 356.

A power supply 357 provides the required voltage V, V/2 and ground to the mixer 320 and are equivalent to V+, ground and V− of the IC circuits as discussed with respect to FIG. 8.

Although the mixer 320 is shown as a separate part, it may be included in the interface 400.

As will be discussed below, the mixer 320, the transmitters 318 and the receivers 122 use common elements which are configured for the appropriate functions to be performed. This increases the signal matching capability and tracking. For example, the compressor 324 is a compandor which is capable of being an expander, or a compressor by merely appropriate connecting the output pins. A typical example is model number SA575 from Signetics. Similarly, the phase-locked loop 336 will only operate as a voltage controlled oscillator to modulate the audio and the video signals in the transmitter 318, whereas a full phase-locked loop is used to demodulate the video signal in the receiver 122. The phase-locked loop 336 may be for example a phase-locked loop model number SE564 also from Signetics.

Figure 6:
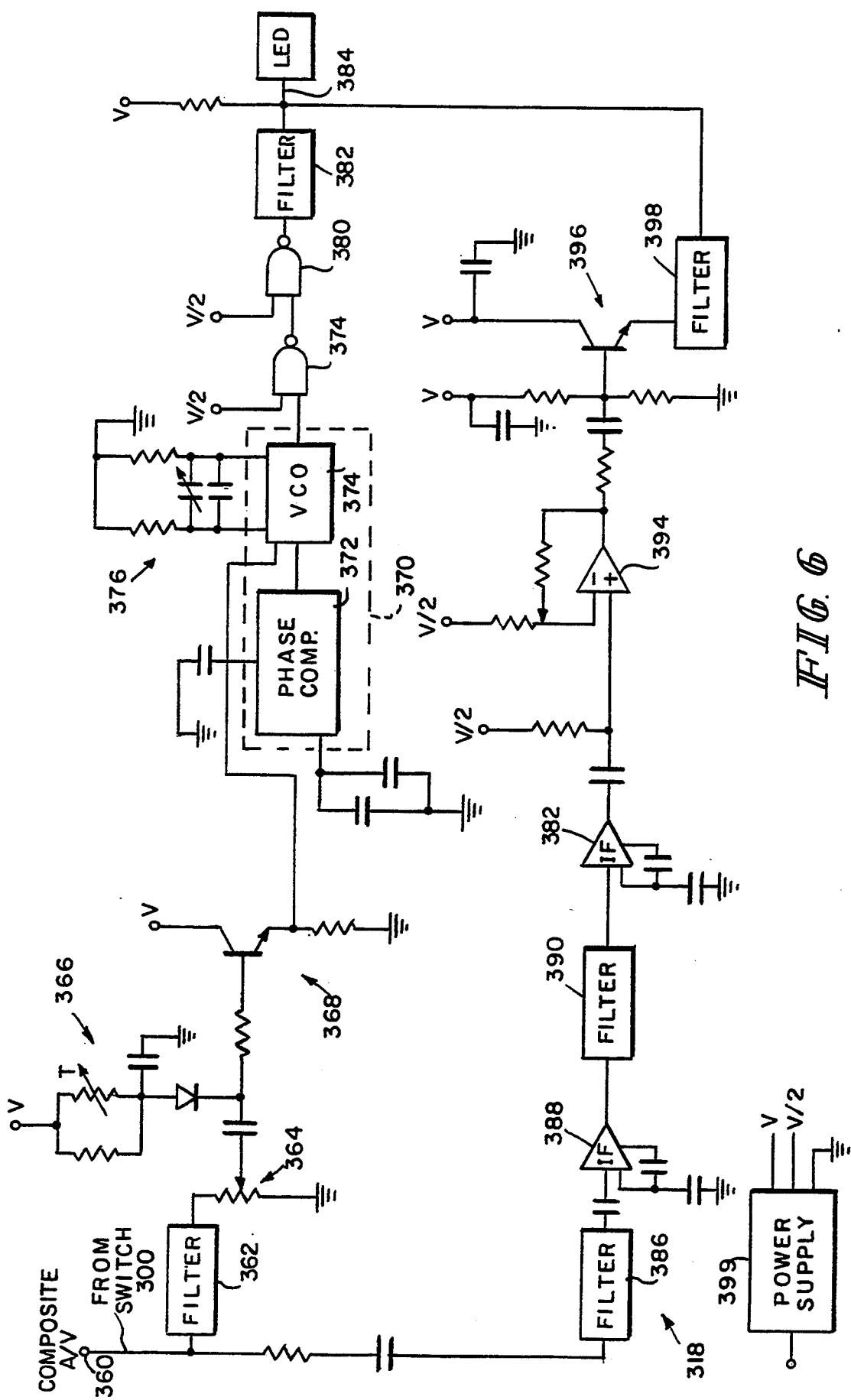
FIG. 6 is a schematic of a transmitter according to the principles of the present invention.

A transmitter 318 is illustrated in FIG. 6 as receiving the composite audio/visual input AV as input 360 from the switch 300. Audio signal filter 362 removes the modulated audio signal and passes the unmodulated video signal to a level adjust 364. A thermistor circuit 366, which is mounted on the casing of the phase-locked loop circuit 370, adjusts the VCO DC bias through the sync tip clamp diode and further through the drive transistor 368. This provides the same temperature compensation as thermistor 346 in the mixer 320.

The output of driver transistor 368 is connected to a voltage controlled oscillator 374 of a phase-locked loop 370 which, as phase-locked loop 336 in the mixer circuit, only uses the voltage controlled oscillator portion. A phase comparator 372 provides additional DC biasing to the voltage controlled oscillator 374. The modulating frequency of the voltage controlled oscillator 374 is set by circuit 376. As previously discussed, in the present embodiment the modulating frequency is 30 mega Hertz.

The output of the voltage controlled oscillator 374 is provided to a pair of digital inverters or drivers 378 and 380 illustrated as NAND gates having one of their terminals connected to V/2 which is considered a ground level signal. The output of the last driver 380 is provided to the output terminal 384 through a high pass filter 382.

The combined audio/video signal is processed by a filter 386 connected to the combined input 360 and having a center pass frequency of the 10.7 mega Hertz of the modulated audio signal. This isolated signal is provided through an IF amplifier 388, filter 390 and IF amplifier 392 to provide an amplified and limited audio signal at the 10.7 mega Hertz signal level. This output is AC coupled to an amplifier buffer 394 and an output buffer 396. The output of buffer 396 is provided through a low pass filter 398 directly to the output 384. The buffer 396 isolates the output 384 and prevents feedback of the video signal into the audio path.

Although the audio signal is modulated in the mixer 320, the mixer 320 may just mix the audio and video signals from the interface as a single input into the switch 300 and the transmitter 318 would include an audio modulator in the audio path.

Both the modulated audio signal and modulated video signal directly drive the output 384 which may be connected to an optical transmitter, for example, a light emitting diode LED, or to a line directly. Since the two signals are separately modulated and drive the output directly, one is not considered a subcarrier of the other. This provides a high signal to noise ratio necessary for quality video and audio transmission.

A power supply 399 provides the required voltage V, V/2 and ground to the transmitter 318 and are equivalent to V+, ground and V− of the IC circuits as discussed with respect to FIG. 8.

Figure 7:
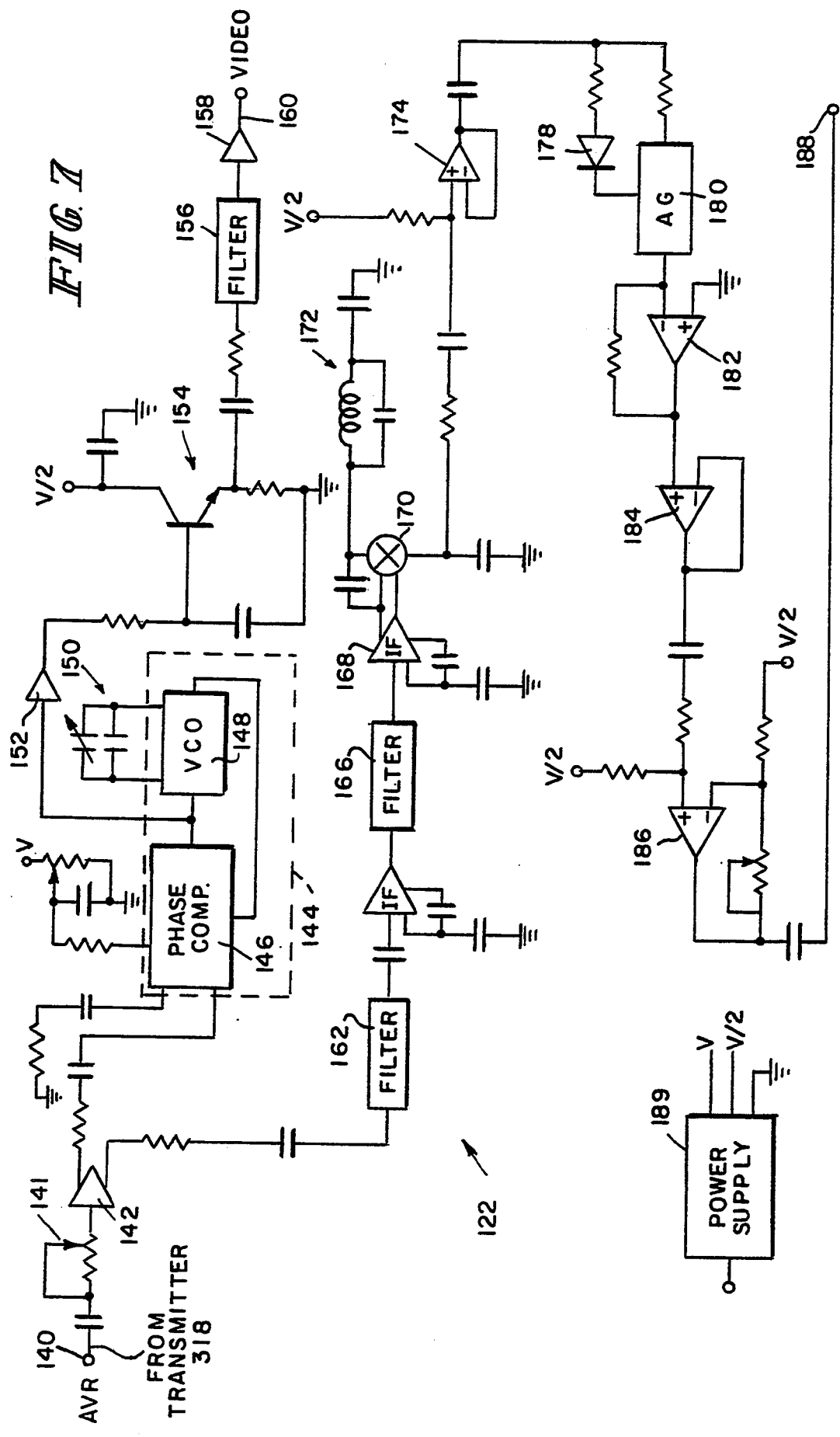
FIG. 7 is a schematic of an optical receiver according to the principles of the present invention.

A fiber optic receiver 122 is illustrated in FIG. 7 as receiving the audio/visual room signal AVR on input 140 from an optical receiver, for example a light sensitive diode. The AVR signal is AC coupled through a level adjust resistor 142 to a pre-amplifier 142 having a pair of outputs. The positive output is AC coupled to a phase-locked loop 144 connected as a demodulator or detector. The input is provided to the phase comparator 146 whose output is connected to a voltage controlled oscillator 148. The output of the voltage controlled oscillator 148 is feed back to the phase comparator 146 to complete the phase-locked loop. The frequency determining circuit 150 is tuned to the video signal modulation frequency of 30 mega Hertz of the present embodiment. The output of the phase comparator 146, which is the demodulated signal is provided through an output amplifier 152 to a driver 154. The output of the driver 154 is connected to a filter 156 which filters out any of the remaining 30 mega Hertz signal. The output of the filter 156 is connected to the video output 160 through a 75 ohm line driver 158. As discussed previously, the phase-locked loop 144 is the same component as the phase-locked loops of 336 of the mixer and 370 of the transmitter. The difference being that 144 is connected as a phase-locked loop wherein for the other two circuits, it is connected only as a voltage controlled oscillator.

The second output of the pre-amp 142 is a AC coupled to a filter 162 which passes the 10.7 mega Hertz signal of the audio. The output of the filter 162 is AC coupled to an IF amplifier 164, a filter 166, and IF amplifier 168 which provides a limited signal. This structure is the same signal processing as IF amplifiers 388 and 392 and filter 390 in the transmitter stage. In addition, both outputs of the final IF filter 168 are connected to a quadrature detector 170. A tune circuit 172 tuned to the 10.7 frequency of the modulated audio signal is also connected to the quadrature detector 170. The output of the quadrature detector 170 is the demodulated audio signal AC coupled to a driver 174.

The filter and IF amplifiers with the quadrature detector are provided in a single FM IF system having part number NE604 from Signetics. This same part may be used with only a portion of the elements connected as the IF amplifiers 388, 392 and filter 390 of the transmitter 318. This reduced the number of parts needed for the various circuits as well as again increases matching of the signals of the tracking.

The output of the driver 174 is connected to an expander which includes a diode stage 178 connected to the automatic gain control stage 180 as an input to a summing amplifier 182 and whose output is connected through an amplifier 184 to provide an expanded output. The expander 176 is the compliment of the compressor 324 in the mixer 320. A Signetics compandor part number NE575 is used and connected as an expander instead of compressor 324 as in FIG. 5. The output of the amplifier 184 is connected to an output driver 186, capable of providing a 600 ohm audio line at output 188.

A power source 189 is provided to provide the regulated signals of V, V/2 and ground and are equivalent to V+, ground and V− of the IC circuits of the receiver 122 as discussed with respect to FIG. 8.

The receiver 122 of FIG. 7 is designed specifically for an optical system wherein the audio and the video signals are separately modulated and provided on a single input. If a hardwired coaxial cable system is used, the input circuitry and the phase-locked loop 144 would be eliminated since the video signal is not modulated. The input circuitry would include common mode rejection and signal shaping prior to driver 154, filter 156 and line driver 158. The audio path would not be changed since it is still a signal modulated 10.7 mega Hertz.

The power supply 357 in the mixer 320, power supply 399 in the transmitter 318 and power supply 189 in the receiver 122 are all common power supplies which provide the signals V, V/2 and ground. These values equate to V+, ground and V− respectively when connected to the appropriate ICs of the different circuits. This allows the power source to be either DC or AC. By offering a common power source, any power source can be used and one does not need a special input to the power circuits.

Such a power source is illustrated in FIG. 8 as having input terminals T1, T2, T3 and T4. The terminals T1 and T3 are connected to a power bus 610 by diodes 612 and 614 respectively and to a ground bus 616 through diodes 618 and 620 respectively. Terminals T2 and T4 are connected directly to the ground bus 616. The diodes 618 and 620 are removable as indicated by the Xs at their junctures with their respective inputs and buses. The rectified signal is stored on capacitor 622 and provided as an input to a voltage regulator 624. The voltage regulator 624 is connected to the ground bus and provides a regulated voltage V at its output which is stored on capacitor 626. A second voltage regulator 620 also is connected to the ground bus 660 and provides that it outputs the value V/2 which is stored on capacitor 630.

A typical example of the values, would be that V=+10 volts and V/2=+5 volts. The voltage regulators 624 and 628 may be a simple voltage divider or may be 7810 and 7805 regulators respectively. The voltage of +10 volts and +5 volts are selected for a minimum input of 12 volts.

Various sources may be connected to the terminals T1 through T4. A DC source, as illustrated in FIG. 9, may be a 12–18 volt DC source having a plus and minus output terminals. The plus terminal of the DC source may be connected to terminals T1 or T3 and the negative connected terminals are T2 or T4. An alternative, illustrated in FIG. 10, is a 24 volt AC signal provided by a center tap transformer. The ends of the transformer would be connected to terminals T1 and T3 with the center tap being connected to T2 or T4. This provides a 12 volt AC signal to the terminals T1 and T3 where it is rectified by diodes 612 and 614 respectfully. The center tap T2 and T4 connected to ground at terminals T2 or T4 allows only half of the voltage across T1 and T3 to be available.

For the DC source of FIG. 9 and the tapped AC source of FIG. 10, the second set of diodes 618 and 620 are not needed and may be removed. They may also not be provided in the original package.

A 12 volt AC signal available at a transformer without a center tap is illustrated in FIG. 11. In such a case, the transformer output is connected directly across terminals T1 and T3, with fluctuating AC signal, a full wave rectifier is required such that all four of the diodes 612, 614, 618 and 620 must be provided. Thus the power source of FIG. 8 is versatile providing a commonality and intechangeability of power sources as well as the ability to connect to a combination of external power.

Figure 12:
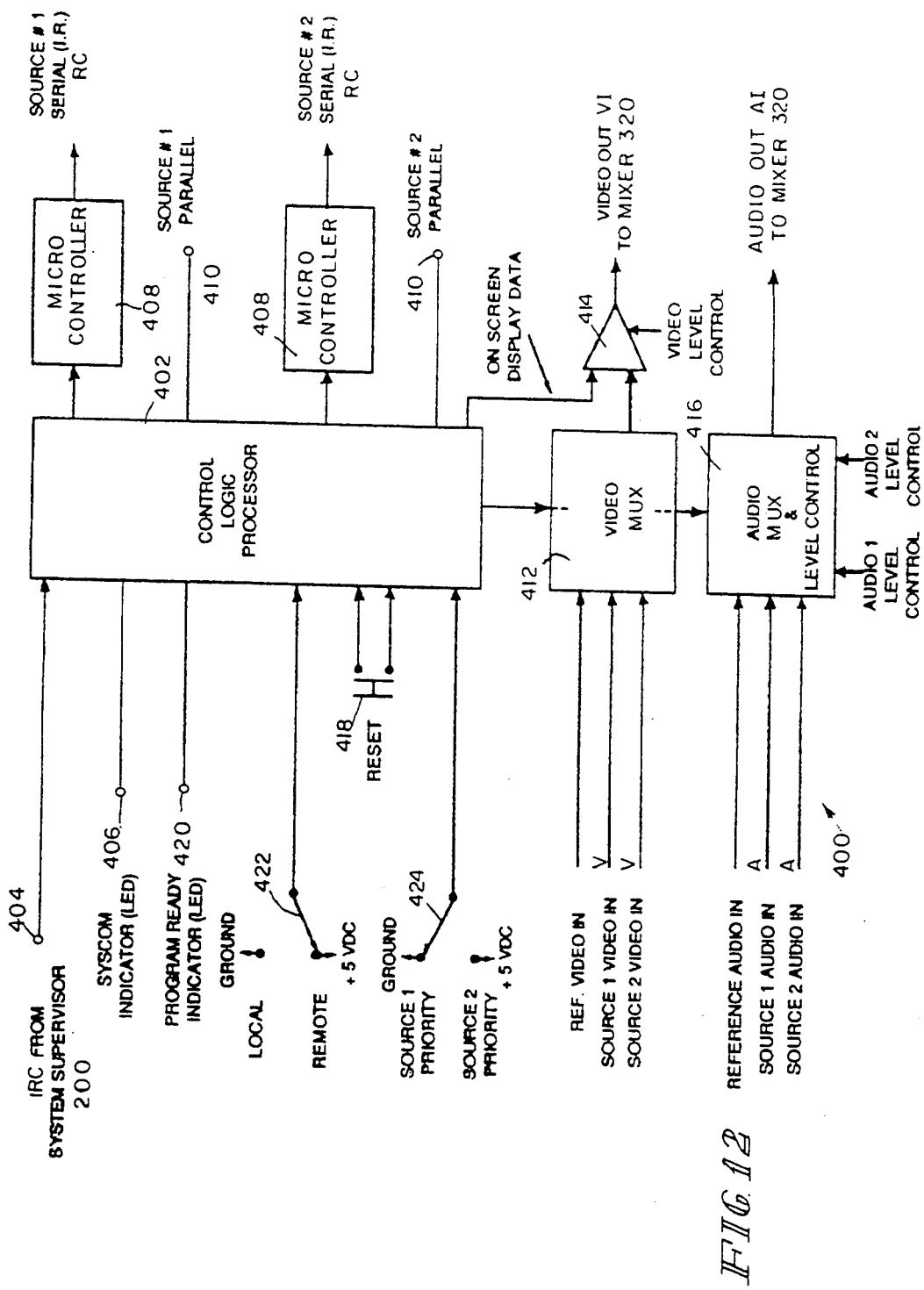
FIG. 12 is a block diagram of a source interface according to the principles of the present invention.

A source interface 400 as illustrated in FIG. 12, includes a logic processor 402 which receives a four bit source control logic signal IRC from the system supervisor 200 at input 404. Once a communication link has been satisfactorily established with the system controller 200, the control logic processor 402 activates a syscom indicator at port 406. The control logic processor 402 decodes the four bit control IRC from the system supervisor 200 to select one of the plurality of sources 500, illustrated herein as two sources, connected to the interface 400 as the source audio/video signals and provide the remote control signals to the selected source 500.

The remote control signals are translated by micro controllers 408, which are plugged into the control logic processor 402, from the system remote control signal to a remote control signal specifically designed for the specific source 500. The outputs 408 are connected to a serial input of the source 500. This may be a serial port or an infra red receiver and thus the micro controllers 408 must generate appropriate signals to drive an infra red signal generator to be received by the specific source. The micro controllers 408 are specifically programmed for the unique source to which it is attached. Therefore, they may be plugged into a standard interface 400 to make it smart for the specific source.

Parallel outputs 410 are also provided for each of the sources to receive parallel control signals for the source. The parallel outputs may control the positioning of a camera or provide numerical values instead of control or function signals. These are connected to sources which require parallel inputs as well as providing the ability to connect the remote control signals internally to the remote source. This internal connection is not desirable since it is very time consuming to find the appropriate points in the circuitry to attach these remote control signals. The infra red transmitters connected to micro controllers 408 may be mounted directly onto the infra red receiver of the source 500 and therefore provided non-invasive connection.

The control logic processor 402 also provides selection signals to video multiplexer 412 and audio multiplexer 416. The video multiplexer 412 has inputs from each of the sources, illustrated for example sources 1 and 2 and a reference video input. One of the three inputs are selected and provided to an output driver 414 which has video level control. The other input to driver 414 is from an on screen display data from the control logic processor 402. The on screen display may be the identification number for the source and the type of source to be provided to the classroom. Also, on screen display information supplemental to that provided with the standard source may also be provided. This would be involved with the remote programming of the system supervisor 200. The reference video input is a default video input which is initially switched to a classroom. This reference video signal is also the encoded signal that the classroom controller 118 is looking for to turn on the terminal program ready light. The output of driver 414 is the video output VI to the mixer 320.

The audio multiplexer 416 has a plurality of audio inputs from sources 1 and 2 and the reference audio input. The modulated ALL CALL signals as well as the ALL CALL announcement would be provided on the reference audio input. Separate level controls are provided for the two audio channels. The output of the audio multiplexer 316 is provided as the audio output AI to the mixer 320. By providing the ALL CALL signal to the interfaces 400, the switch 300 can be used to select the rooms to which the ALL CALL signal is routed. If all the rooms are to receive the ALL CALL, the ALL CALL signal may be provided directly to all the mixers 320.

Once a source has been loaded and is ready to be controlled the operator will press the reset button 418. The control logic processor 402 activates the program ready indicator connect to terminal 420 and selects the reference video input and the reference audio input of the multiplexers 412 and 416. The transmission of the audio/video signals through the switch 300, activates the program ready light in the classroom.

Switch 422 selects either a remote or local control selection to the control logic processor 402. In the local control, the control signals IRC from the system supervisor 220 are disabled. This allows the operator local control over the sources and interface for testing, loading, etc. A switch 424 also provides a priority of source 1 or 2 as the default source. The system controller 402 may be a 68HC11 available from Motorola appropriately programmed to produce the function previously desired or simple logic. The microcontrollers 408 are 16C55 available from Microchip with a monostable multivibrator output and appropriately programmed to translate the remote control signals from the control logic processor 402 and for specific source.

If stereo audio signals are available from the source 500, a second modulating circuit would be provided in each of the mixers 320. In the example used, one channel would be modulated at 10.7 mega Hertz and the second channel at 11.3 mega Hertz. The transmitters 318 would include a pair of parallel audio signal processing paths as would the receivers 122.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for interconnecting a plurality of sources of audio and video signals and a plurality of audio and video communication devices comprising:
    switch means for selectively connecting said plurality of audio and video signals from said plurality of sources at its inputs to its outputs;
    a plurality of first modulating means for receiving and modulating an audio signal from a respective source and providing said modulated audio signal as said audio signal input to said switch means;
    a plurality of transmitter means, connected to a respective output of said switch means and including second modulating means for modulating received video signals, for transmitting said modulated video signals and received modulated audio signals simultaneously at an output; and
    a plurality of receiver means connected to said output of a respective transmitter means for receiving, separating and demodulating said transmitted video and audio signals and providing said demodulated video and audio signals at an output for a respective communication device.

2. A system according to claim 1 including:
    a plurality of mixing means for receiving and combining said modulated audio signal from a respective first modulating means and a video signal from a respective source and providing said combined signal as said audio and video signal input to said switch means; and
    a plurality of separating means for separating a combined signal of a respective output of said switch means into said video signal to be modulated by a respective second modulating means and said modulated audio signal.

3. A system according to claim 2 wherein said mixing means includes a differential amplifier receiving said modulated audio signal on one of its inputs and said video signal on its other input.

4. A system according to claim 1 wherein said audio signals are stereo;
    including a plurality of third modulating means for receiving and modulating said stereo audio signals with said first modulating means from a respective source and providing said modulated audio signals as said audio inputs to said switch means; and
    wherein said receiver means demodulates said stereo audio signals and provides said demodulated stereo audio signals at its output.

5. A system according to claim 1 wherein said first and second modulating means frequency modulate said video and audio signals respectively in the RF range.

6. A system according to claim 1 wherein said transmitter means and receiver means are optical and are connected by optical transmission lines.

7. A system according to claim 1 wherein said transmitter means and said receiver means each include a power means for converting AC and DC power to DC power having values of V, V/2 and ground representing V+, ground and V-respectively.

8. A system according to claim 7 wherein said power means includes:
    first and second power input terminals and a ground input terminal;
    power bus and ground bus;
    said ground input terminal being connected to said ground bus;
    first pair of diodes connecting said first and second power input terminals to said power bus; and
    second pair of removable diodes connecting said first and second power input terminals to said ground bus.

9. A system according to claim 1 wherein said first modulating means is a voltage controlled oscillator having a tuned circuit of a capacitor and an inductor for determining the frequency of modulation.

10. A system according to claim 9 wherein said receiver means each include a demodulator means for said audio signal having a tuned circuit of a capacitor and an inductor for determining the frequency of demodulation.

11. A system according to claim 9 wherein:
    said first modulating means includes means for compressing and limiting said received audio signals before modulation; and
    said receiver means includes means for expanding said demodulated audio signals.

12. A system according to claim 9 including a thermistor thermally and electrically connected to said first modulating means for temperature compensating the modulation of said first modulating means.

13. A system according to claim 1 wherein said switch means and receiver means are connected by coaxial electrical transmission lines.

14. A system according to claim 1 wherein:
    said first modulating means and said second modulating means each include only a voltage controlled oscillator portion of a phase-locked loop; and
    said receiver means each include first demodulator means and said second demodulator means each include a phase-locked loop for demodulating said separated audio and video signals.

15. A system according to claim 1:
    wherein each of said sources includes audio/video port and remote control port;
    wherein each of said communication devices includes audio/video port and remote control port for communicating audio/video signals received at its audio/video port and generating system remote control signals at its remote control port;
    including a plurality of source interface means each having one or more source inputs connected to said audio/video port of one or more of said sources, having one or more source remote control outputs connected to said remote control port of one or more of said sources, having a system remote control input and having a source audio/video output; and each of said source interface means being programmable to directly convert system remote control signals to source remote control signals for the source connected to said interface means on a one to one basis.

16. A system according to claim 15 wherein at least one of said remote control input ports of said sources is an optical receiver and at least one of said remote control outputs of said source interface means is an optical transmitter.

17. A system according to claim 15 wherein said source interface means each include multiplexed means for selecting which of the sources connected to it is interfaced to said switch means.

18. A system according to claim 17
including all call means connected as a source input for each of said source interface means for providing an all call audio/video signal common to all source interface means; and
wherein said multiplexer means of each source interface means selects said all call signal as a source for an all call condition.

19. A system according to claim 15 wherein said said transmitter means and said receiver means each include means for communication of said systems remote control signals by dual tone multiple frequency modulation.

20. A system according to claim 15 wherein:
at least one of said communication devices includes a display screen and a computer control entry device;
one of said sources is a computer; and
said switch mean selectively connects said display screen and said computer control entry device and said computer.

21. A system according to claim 20 wherein said computer control entry device is wireless and said computer has a wireless entry device port connected to one of said source interface means.

22. A system according to claim 15 wherein said source interface means includes means for generating video signals from stored data in response to system remote control signals.

23. A system according to claim 15
wherein each of said communication devices communicating audio/video signals received at its audio/video port and responding to communication device remote control signals at its remote control port; and
including a plurality of communication device interface means being programmable for directly converting system remote control signals to communication device remote control signals for the communication device connected to said communication device interface means on a one to one basis and transmitting system remote control signals.

* * * * *